US006892552B2

(12) United States Patent
Richman et al.

(10) Patent No.: US 6,892,552 B2
(45) Date of Patent: May 17, 2005

(54) SYSTEM AND METHOD FOR COOLING AIR INHALED BY AIR CONDITIONING HOUSING UNIT

(75) Inventors: Martin Richman, Leawood, KS (US); Lisa Richman, Leawood, KS (US)

(73) Assignee: Physics Support Services, LLC, Kansas City, MO (US)

( * ) Notice: Subject to any disclaimer, the term of this patent is extended or adjusted under 35 U.S.C. 154(b) by 231 days.

(21) Appl. No.: 10/337,143

(22) Filed: Jan. 6, 2003

(65) Prior Publication Data
US 2004/0129014 A1 Jul. 8, 2004

(51) Int. Cl.[7] .............................. F28D 3/00; F28D 5/00
(52) U.S. Cl. ......................................... 62/305; 62/171
(58) Field of Search .................................. 62/305, 171

(56) References Cited

U.S. PATENT DOCUMENTS

| | | | |
|---|---|---|---|
| 150,742 A | 5/1874 | Prentice | |
| 740,714 A | 10/1903 | Titus | |
| 876,453 A | 1/1908 | Heard | |
| 1,196,664 A | 8/1916 | Comins | |
| 1,476,773 A | 12/1923 | Simon | |
| 1,950,046 A | 3/1934 | Cone | |
| 2,821,437 A | 1/1958 | Lesher | |
| 2,940,466 A | 6/1960 | Speights | |
| 3,015,910 A | 1/1962 | McMaster et al. | |
| 3,351,291 A | 11/1967 | Pohle | |
| 3,613,392 A * | 10/1971 | Di Tucci | 62/184 |
| 4,020,895 A | 5/1977 | Schafer | |
| 4,022,382 A | 5/1977 | Engdahl, Jr. | |
| 4,132,263 A | 1/1979 | Stinnett | |
| 4,272,026 A | 6/1981 | Jazlowski et al. | |
| 4,672,817 A * | 6/1987 | Croce | 62/183 |
| 4,685,308 A * | 8/1987 | Welker et al. | 62/171 |
| 4,872,613 A | 10/1989 | Hucul et al. | |
| 4,874,038 A | 10/1989 | Ehlert | |
| 4,961,535 A | 10/1990 | Skibik | |
| 5,074,124 A * | 12/1991 | Chapman | 62/305 |
| 5,117,644 A * | 6/1992 | Fought | 62/171 |
| 5,121,882 A | 6/1992 | Skidmore | |
| 5,183,102 A | 2/1993 | Clark | |
| 5,273,214 A | 12/1993 | Huffstutler | |
| 5,285,651 A * | 2/1994 | Marine | 62/171 |
| 5,330,104 A | 7/1994 | Marcus | |
| 5,605,052 A * | 2/1997 | Middleton et al. | 62/171 |
| 5,628,203 A | 5/1997 | Adolph et al. | |
| 5,628,459 A | 5/1997 | Bennett, Jr. | |
| 5,701,748 A * | 12/1997 | Phelps et al. | 62/91 |
| 5,732,881 A | 3/1998 | Wolter | |
| 5,806,769 A | 9/1998 | Womack | |
| 5,836,516 A | 11/1998 | Van Epps et al. | |
| 5,913,477 A | 6/1999 | Dean | |
| 5,975,192 A | 11/1999 | Moratalla et al. | |
| 5,996,142 A | 12/1999 | Colman | |
| 6,000,631 A | 12/1999 | Lamminen | |
| 6,003,781 A | 12/1999 | Kwan | |
| 6,082,633 A | 7/2000 | Kephart et al. | |
| 6,098,900 A | 8/2000 | Smith | |
| 6,173,906 B1 | 1/2001 | Von Kerens | |
| 6,189,805 B1 | 2/2001 | West et al. | |
| 6,237,860 B1 | 5/2001 | Ducey | |

(Continued)

OTHER PUBLICATIONS

Author unknown; *AC & Swamp Coolers*, printer from www.troubleshooter.com website on Aug. 21, 2002.

Author unknown; *"Swamp" Coolers, What they are & How they work*, printed from www.fathom.org website on Aug. 21, 2002.

Primary Examiner—William C. Doerrler
(74) Attorney, Agent, or Firm—David E. Herron, II

(57) ABSTRACT

The invention is a system for evaporatively cooling the intake air for an air conditioning housing unit. The system includes a plurality of conduits connected to a fluid source, and nozzles configured to expel vapor into a perimeter of the housing unit.

14 Claims, 5 Drawing Sheets

U.S. PATENT DOCUMENTS

| | | | |
|---|---|---|---|
| 6,253,565 B1 * | 7/2001 | Arledge | 62/305 |
| RE37,402 E * | 10/2001 | Akazawa | 62/303 |
| 6,347,526 B1 | 2/2002 | Ledbetter | |
| 6,394,368 B1 | 5/2002 | Hintz | |
| 6,398,132 B1 | 6/2002 | Junkel et al. | |
| 6,415,994 B1 | 7/2002 | Boggs | |
| 6,438,977 B1 * | 8/2002 | McKay | 62/171 |
| 6,658,872 B1 | 12/2003 | James | |

* cited by examiner

SYSTEM AND METHOD FOR COOLING AIR INHALED BY AIR CONDITIONING HOUSING UNIT

BACKGROUND OF THE INVENTION

On hot days, conventional residential or commercial air-conditioning units are frequently overburdened by the task of adequately cooling a home or other building. Often times the cooling system will remain on for long periods of times while the unit tries to maintain a set temperature. Worse yet, the air-conditioning system will operate continuously, even worse, household or building temperature will slowly rise while the air-conditioning unit operates at its maximum cooling capability using large amounts of costly electrical energy.

When operating in these conditions, the air-conditioning unit is under excessive stress due to internal temperatures and pressures that are at or above maximum design limits which will shorten the life of major components such as the compressor. So in addition to high operating costs, one must deal with increased maintenance costs and the cost of more frequent replacement of major components due to premature wear.

This invention is a device that will aid the air-conditioning unit on days when the electrical and mechanical demands on the system are excessive and even on days when weather conditions are not so extreme. The inventive system will increase the efficiency of the entire system at any time when it is appropriate to operate an air-conditioning unit with the purpose of cooling a volume of air.

The system can be constructed in different configurations that will make its application possible with most residential air conditioners. The system has application with larger industrial units as well.

The invention includes piping network with misting devices configured to envelop a residential or commercial air conditioning unit, thereby cooling air inhaled into the unit.

It is a well-known thermodynamic phenomenon that the evaporative process of any substance will extract heat from the surrounding air. When water under pressure is released into air as a mist it will more freely evaporate and draw significant quantities of heat from the surrounding environment. This change in thermodynamic state from liquid to vapor cools the surrounding air. Sufficient pressure exists in a public water supply to create a mist or fog when the pressurized water is released through a misting device.

Through the process of evaporative cooling, the mist cools the ambient air surrounding the air conditioner housing unit. Additional evaporation occurs with the aid of the condensing unit's fan. The result is a system that runs with higher efficiency saving operating costs and maintenance costs.

When cooler air blows across a heat exchanger, the result is lower internal temperatures and pressures in all parts of the air conditioning system. The are several beneficial consequences of this. First, the compressor will not work as hard to pump the coolant substance (in most cases Freon) through the a closed air-conditioning system, thereby reducing the electrical demand and reducing the current required to run the compressor. Whenever the compressor is in operation, the supplied electrical power will be less.

Second, the temperature of the supply air flowing through a home or commercial building duct system will be measurably lower compared to an air conditioner unit operating without the misting network. The reduced temperature of air flowing through the duct work will cause the air in the building to be cooled more rapidly. The temperature set on a temperature controlling device such as a thermostat can be reached more quickly and efficiently with the effect that the unit will turn off sooner than if the heat exchange unit (such as an air conditioning compressor) were not being cooled by the evaporating water mist.

The invention is a system and method for cooling the intake air for an air conditioner housing unit. The invention includes a plurality of conduits connected to a fluid source. At least one nozzle is positioned adjacent a terminal end of each conduit. These nozzles are configured to expel vapor, preferably water vapor, substantially around an entire perimeter of the horsing. In a preferred embodiment, the plurality of conduits form a network that engages the housing.

SUMMARY OF THE INVENTION

The invention is a system for cooling the intake air for an air conditioner housing unit. The system includes a plurality of conduits connected to a fluid source. At least one nozzle is positioned adjacent a terminal end of each conduit. These nozzles are configured to expel vapor, preferably water vapor, substantially around an entire perimeter of the housing. In a preferred embodiment, the plurality of conduits form a network that engages the housing.

Optionally, the system may include a valve in communication with the fluid source; this valve may be configured to selectively allow fluid to enter the network of conduits. Additionally, an electronic switch may be used in cooperation with the valve.

The system may include a sensor in communication with the compressor to sense when the housing inhales air from the surrounding area. Preferably, this sensor may be in communication with the valve, and configured to open the valve when the housing actively inhales air from the surrounding area. Moreover, the sensor may act to close the valve when the compressor is inactive.

In another preferred embodiment, the sensor is in electric communication with a thermostat and thermometer within the interior of a residence. In this embodiment, a resident may selectively set desired temperature parameters for the interior of the residence, and the sensor may then activate the system when the temperature exceeds these parameters. The system may also include a manifold containing the network, and this manifold may be configured to engage the unit housing.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
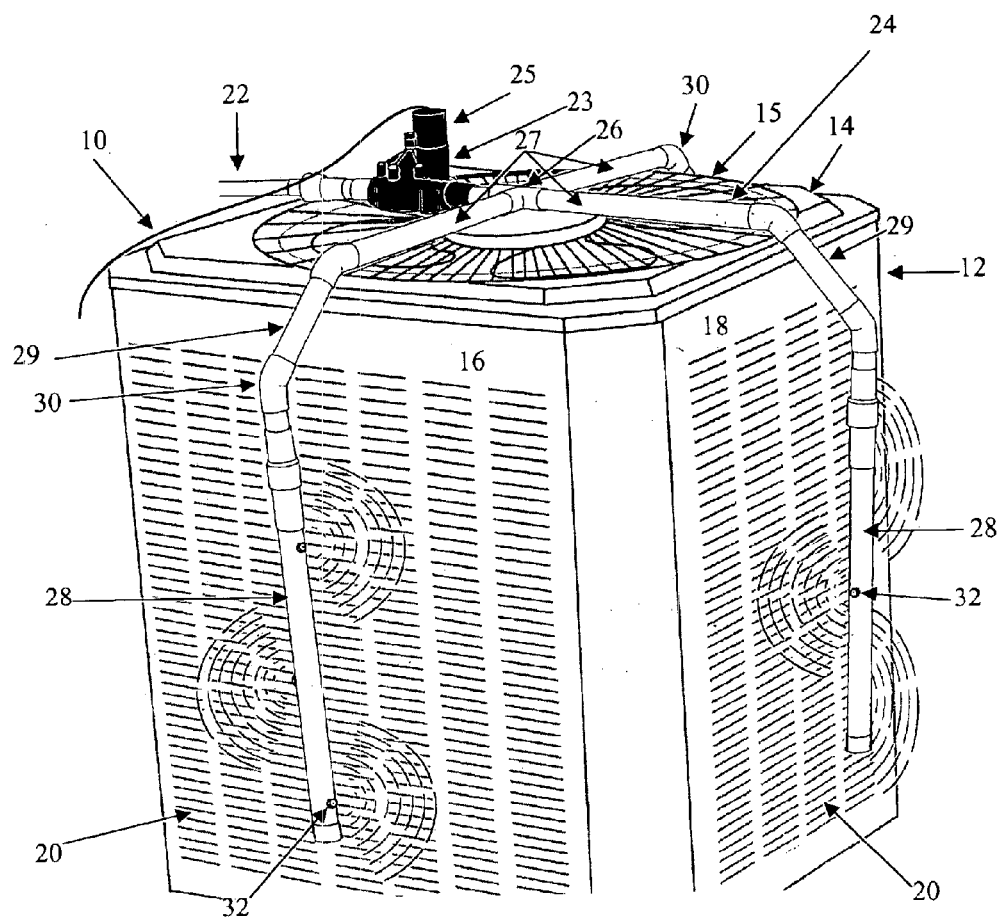
FIG. 1 is a perspective view of a first embodiment of the system for cooling intake air inhaled by an air conditioning housing, according to the principles of the invention.

FIG. 1 shows a first embodiment of the system 10 for cooling intake air inhaled into an air conditioning unit housing 12. The system 10 includes a plurality of conduits 24 linked to form a network that generally surround a housing 12. An inlet 22 supplies fluid, preferably water, to the conduits 24. In FIG. 1, each conduit 24 emanates from a central junction 26. A valve 23 or electronic switch 25 may be positioned in communication with the inlet 22; in a preferred embodiment, the switch and valve are positioned in the central junction 26. Generally, the valve 23 and the switch 25 function together as a single electronic shutoff valve, having a solenoid and a valve. Generally, the solenoid will be activated by a 24 Volt signal that appears at a contact point within the condensing housing unit 12.

As shown in FIG. 1, the housing unit 12 has a top 14 and sides 16,18. Each of the top 14 and sides 16,18 is equipped with vents 20 to allow air to be inhaled into the housing unit 12. The network of conduits 24 is shown to actually engage the housing unit 12 by sitting atop it. Alternatively, the conduits 24 may be encased within a manifold that is formed to engage the compressor.

The housing unit 12, as shown in FIG. 1, bears a generally polygonal cross-section at planes parallel to the ground. Of course, it is well-known that compressors are manufactured with varying configurations, such as cylindrical or other polygonal shapes. The system 10 herein disclosed is adaptable to fit varying shapes and sizes of housing units 12.

Still referring to FIG. 1, each conduit 24 has a first portion 27 that extends from the central junction 26. The first portion 27 terminates at a bend 29, and a terminal portion 28 of the conduit 24 extends from the bend 29. In the embodiment shown in FIG. 1, the bend 29 includes a pair of elbows 30 and a short length of pipe therebetween.

Still referring to FIG. 1, the terminal portion 28 should be long enough so that it extends over the vent 20 that is respectively positioned on the sides 16, 18 of the housing unit 12. This configuration allows vapor to be expelled from nozzles 32 positioned on each terminal portion 28. The nozzles 32 may point directly at the vents 20; however, they may also be pointed, as shown, at angles displaced from one another along the longitudinal axis of the terminal portion 28.

A valve 23 is positioned adjacent the fluid inlet 22 in order to selectively enable fluid to pass into the conduits 24 by entering the junction 26. In this embodiment, the valve 23 is in communication with a switch 25. Preferably, the switch 25 is in electric communication with the fan or compressor within housing unit 12. Specifically, when either of these devices (i.e., the fan or compressor) within the housing unit 12 causes air to be inhaled into the housing unit 12 through its vents 20, the switch 25 opens the valve 23. Conversely, when the housing unit 12 is inactive, the switch 25 maintains the valve 23 in a closed position. This valve 23 and switch 25 combination cooperate to conserve fluid.

Figure 2:
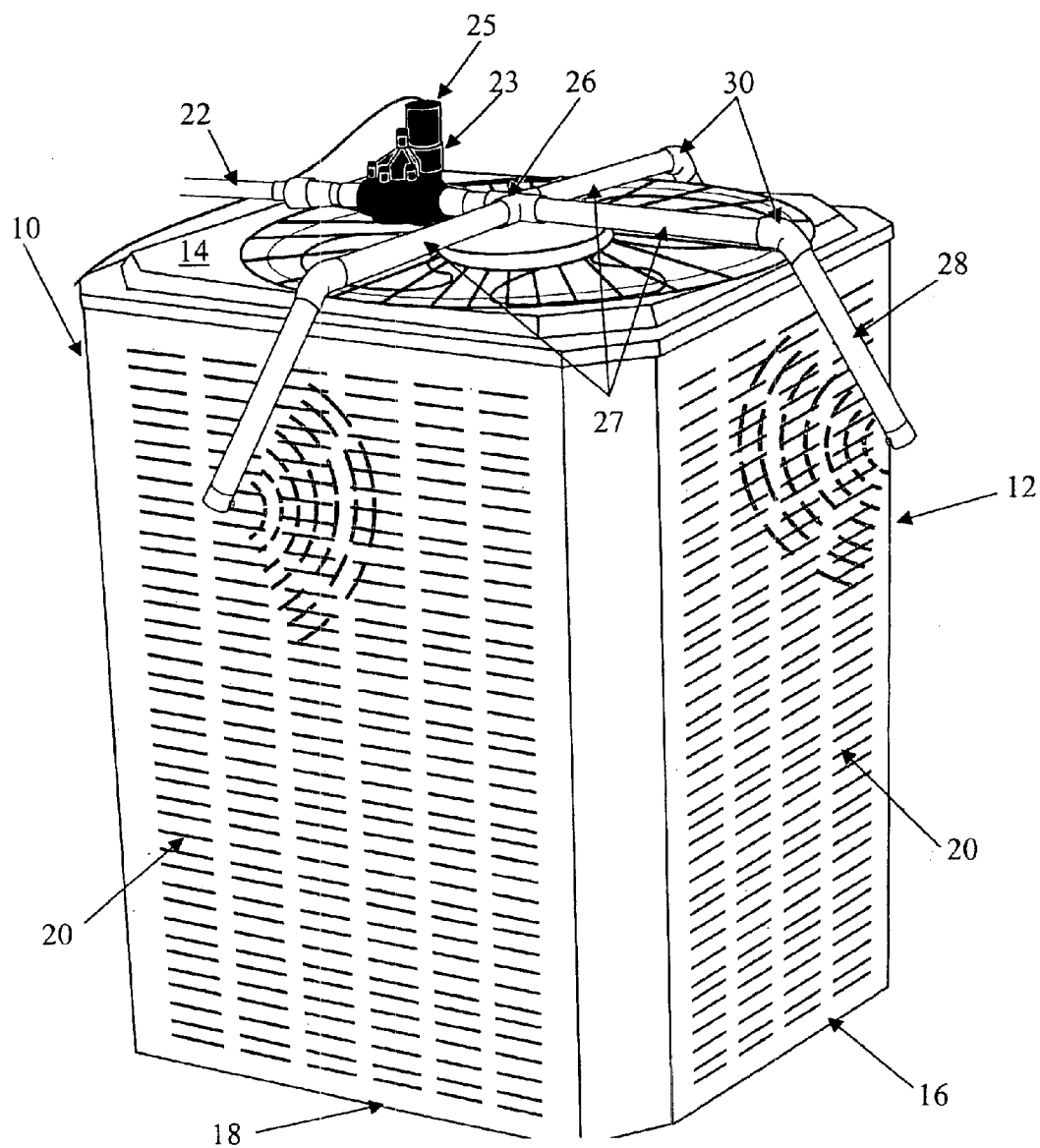
FIG. 2 is a perspective view of another embodiment of the system for cooling intake air inhaled by an air conditioning housing unit, according to the principles of the invention.

FIG. 2 shows another embodiment of the system 10. In order to establish continuity and to facilitate understanding, analogous parts are given identical reference numbers, even if the structure varies. In many ways, the embodiment shown in FIG. 2 is the same as the embodiment depicted in the prior figure. However, note the difference in structure of the conduits 24. Each conduit 24 has an initial section 27 connected to the junction 26 at one end, and an elbow 30 at the other. The elbow 30 connects the initial section 27 to the terminal section 28.

Figure 3:
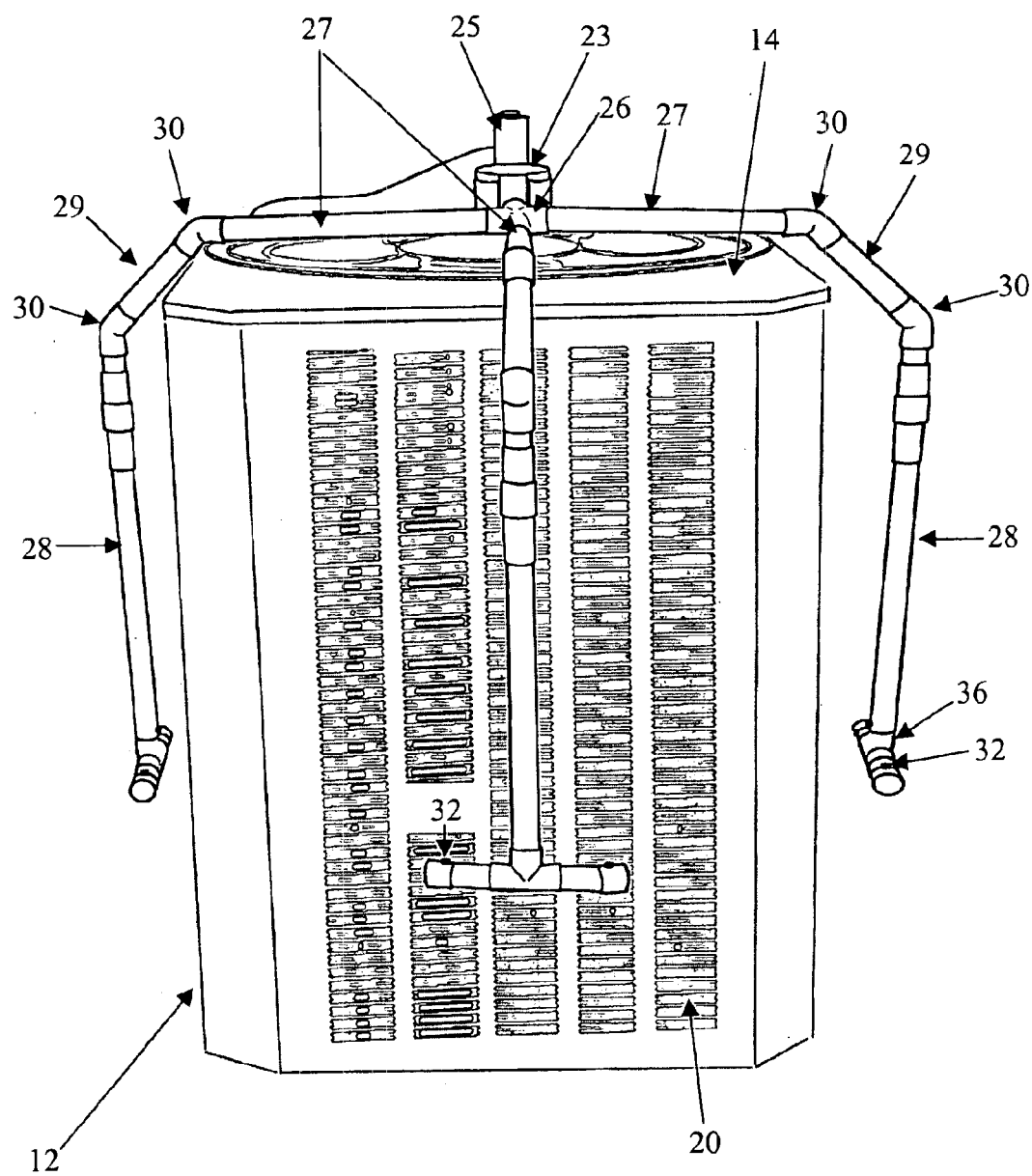
FIG. 3 is a perspective view of another embodiment of the system for cooling intake air inhaled by an air conditioning housing unit, according to the principles of the invention.

FIG. 3 shows another embodiment of the system 10. In order to establish continuity and to facilitate understanding, analogous parts are given identical reference numbers, even if the structure varies. The system 10 includes a network of conduits 24 connected to a fluid source (not shown in FIG. 3, but viewable in FIG. 1). A valve 23 is positioned upstream of the junction 26, and a switch 25 is in communication with the valve 23. The switch 25 may be in electric communication with either the fan or compressor within housing unit 12, or may be in electric communication with a thermostat within the building or home. When the housing unit 12 is operative, the switch 25 opens the valve 23, thereby allowing fluid into the conduits 24. Conversely, when the unit is inoperative, the switch 25 maintains the valve 23 in the closed position.

FIG. 3 shows an alternative design for the terminal section 28. Note that a T-configuration 36 is positioned adjacent a terminal end of the terminal section 28. In this embodiment, nozzles 32 are positioned along the T configuration, and pointed in the general direction of the vents 20 of the housing unit 12. Of course, additional nozzles may be attached to the general vertical portion of the terminal section 28, as well as on the T-portion.

Figure 4:
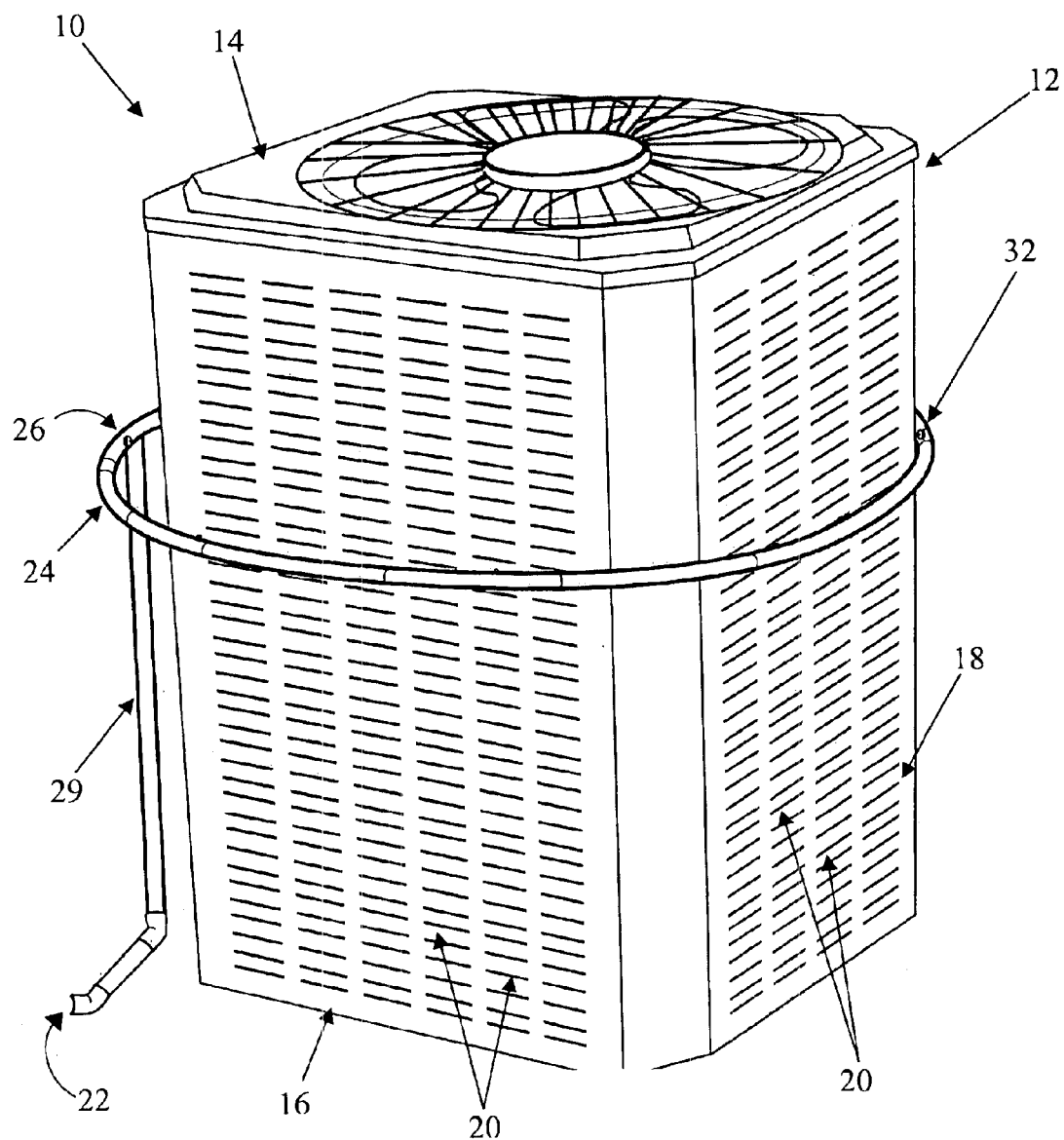
FIG. 4 is a perspective view of another embodiment of the system for cooling intake air inhaled by an air conditioning housing unit, according to the principles of the invention.

FIG. 4 shows an another embodiment of the system 10. In order to establish continuity and to facilitate understanding, analogous parts are given identical reference numbers, even if the structure varies.

As shown in FIG. 4, the inlet 22 supplies fluid, preferably water, to a central junction 26. The inlet 22 may be a common garden hose supplying water to the conduits 24. As shown, the inlet 22 includes a pipe 29 leading to the junction 26. In the embodiment shown in FIG. 3, the conduits 24 form a network that encircles the housing unit 12. While the conduits 24 are shown to be a circular configuration, other configurations are possible, of course. Nozzles 32 are positioned at various locations along the conduits 24 so that faces 16,18 of the housing unit 12 are sprayed with vapor or mist.

In the embodiment shown in FIG. 4, the pipe 29 also serves as a support that holds the conduits in a position above the ground. Alternatively, stands may be positioned to hold the conduits 24 in a position that would enable the nozzles 32 to expel vapor toward respective vents 20 on the sides 16,18 of the housing unit 12. In another embodiment, braces may be placed or mounted on the sides of the housing unit 12 to provide support for the conduits 24.

Figure 5:
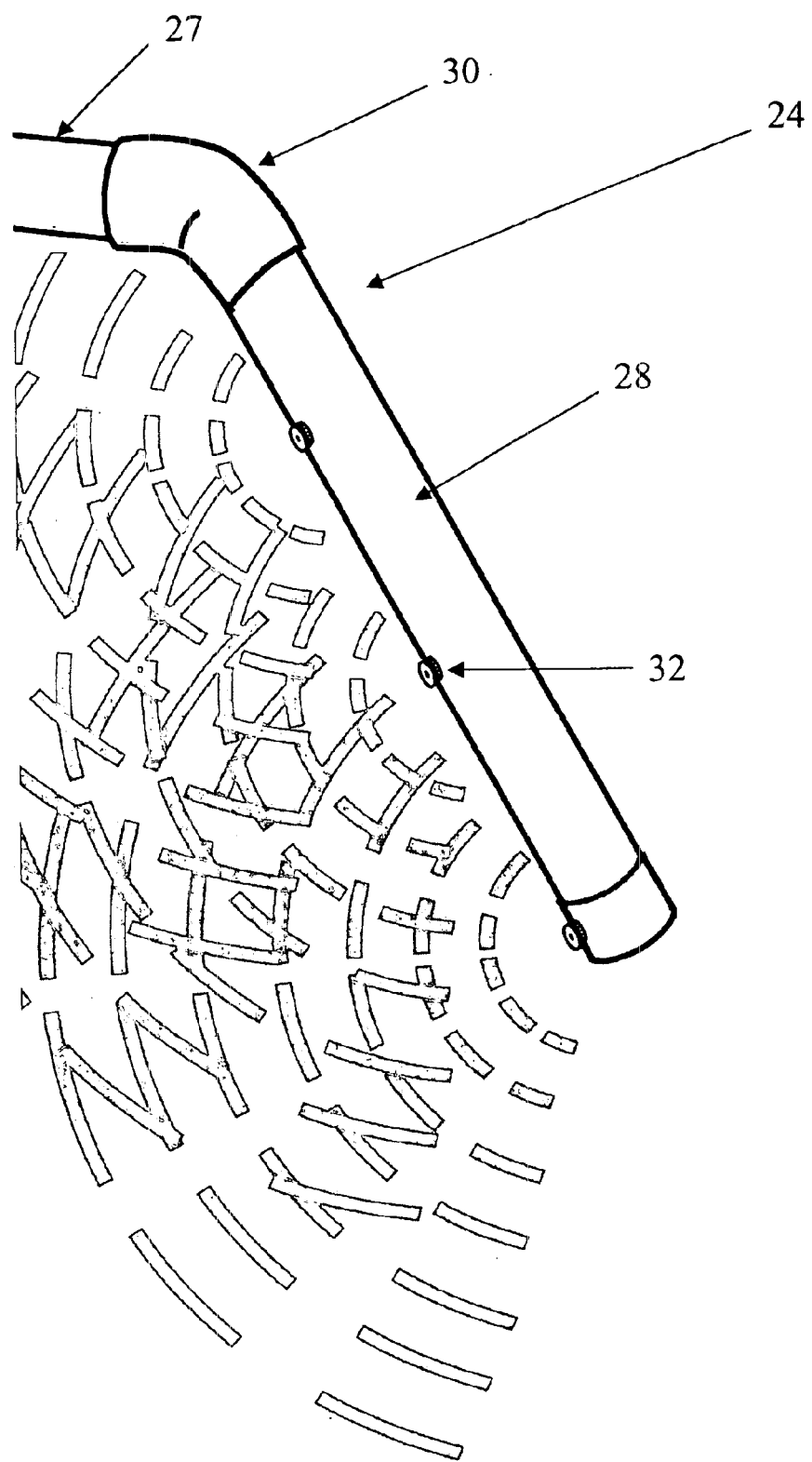
FIG. 5 shows a view of one of the conduits included in the system.

FIG. 5 shows a close-up view of a conduit 24. The first portion 27 of conduit 24 leads to an elbow 30. As shown in FIG. 5, the conduit may be of a well-known, PCV piping; alternatively, any of the parts may be specially made or unitary. The elbow 30 extends between the first portion 27 and the terminal portion 28. At least one nozzle 32 is positioned near a terminal end of the terminal portion 28 of the conduit 24.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A system for cooling hub air for an air conditioning housing unit, the system comprising:

fluid source;
a fluid splitter generally centered on a top face of the housing unit and connected to the fluid source, the splitter having
   a single fluid inlet port in fluid communication with the fluid source, and at least two fluid outlet ports
   a plurality of conduits, each respective conduit having an initial section resting on the top face of the housing unit and coupled to a respective outlet port of the splitter, an elbow joint coupled to the initial section, and a terminal section extending downwardly from the respective elbow, wherein each elbow is positioned to be adjacent a respective edge of the top face of the housing unit;
a plurality of nozzles positioned on each respective terminal section, the nozzles configured and positioned to expel vapor in a perimeter of the housing unit, enabling the vapor to evaporatively cool air that is inhaled into the housing unit.

2. The system as in claim 1, further comprising:
a valve configured to selectively allow fluid to enter the splitter.

3. The system as is claim 2, further comprising
a switch configured to open the valve when the housing unit actively inhales air from the perimeter; and close the valve when the housing unit is inactive.

4. The system as in claim 1, wherein the splitter is a four-way splitter with a single inlet port and three respective outlet ports, the ports generally disposed in a coplanar relation, and each respective port is generally perpendicular to an adjacent port.

5. The system as in claim 1, the fluid source comprising a garden hose.

6. The system as in claim 1, wherein
the terminal section includes one of
   a general T-configuration; or a
   a general Y-configuration.

7. The system as in claim 1, wherein the nozzles are angularly displaced from one another with respect to a longitudinal axis of the terminal section.

8. A system for evaporatively cooling air inhaled into an conditioning housing unit, the system comprising:
a fluid source providing fluid to an inlet port of a fluid splitter having three outlet ports;
a network of conduits, each conduit having
   an initial section engaging a top surface of the housing and extending from a respective outlet port;
   an elbow joint adjacent a terminal end of the initial section;
   a terminal section extending from the elbow, wherein the network is positioned and configured to grip the housing unit; and thereby hold the network in place;
   each terminal section including at least one of
      a straight configuration;
      a T-configuration; or
      a Y configuration;
a valve configured to selectively allow fluid to enter the inlet port of the splitter;
a plurality of nozzles positioned on respective terminal sections of the conduits; wherein, the nozzles and conduits are cooperatively positioned and configured to expel mist in an area surrounding the housing, thereby cooling air inhaled into the housing unit.

9. A method for evaporatively cooling air inhaled into an conditioning housing unit, the method comprising the steps of:
providing a fluid source;
selecting a fluid splitter having an inlet port and three outlet ports;
connecting the fluid source to the inlet port of the splitter;
selecting a general central location on a top face of the air conditioning housing unit;
resting the fluid splitter on the top face of the air conditioning housing unit and within the general central location;
measuring a respective distance from each respective outlet port of the splitter to a corresponding edge of the top face;
cutting an initial section of conduit to approximate the respective distances derived in the measuring step;
coupling a first end of each initial section of conduit to its respective a outlet port;
attaching an elbow joint to a second end of each initial section of conduit, each elbow joint configured to receive a terminal section of conduit that will depend downwardly from the initial section;
positioning the respective initial sections and elbow joints so that as the initial sections rest on the top face of the housing unit, the conduits form a network that grips the housing unit and holds the network in place;
configuring a plurality of nozzles on each terminal section so that each nozzle expels vapor in a perimeter or the housing unit, thereby evaporatively cooling air inhaled by the air conditioning housing unit.

10. The method of claim 9, further comprising the step of providing a valve configured to selectively enable fluid to enter the splitter.

11. The method of claim 9, further comprising the step of configuring each terminal section to include at least one of
a T-configuration; or
a Y configuration.

12. The method as in claim 9, wherein each initial section rests on the top face of the housing unit.

13. The method as in claim 9, wherein the nozzles are pointed in directions that are angularly displaced from one another with respect to a longitudinal axis of the terminal section.

14. The method as in claim 9, wherein the splitter includes three outlet ports.

* * * * *